United States Patent [19]

Zeyra

[11] 4,167,204
[45] Sep. 11, 1979

[54] APPARATUS FOR INFLATING TOY BALLOONS

[75] Inventor: Avraham Zeyra, Los Angeles, Calif.

[73] Assignee: Creative Balloons, Inc., Carmel Valley Village, Calif.

[21] Appl. No.: 818,012

[22] Filed: Jul. 22, 1977

Related U.S. Application Data

[60] Continuation of Ser. No. 679,475, Apr. 22, 1976, abandoned, which is a division of Ser. No. 563,500, Mar. 31, 1975, Pat. No. 3,994,324.

[51] Int. Cl.² .............................................. F16K 15/20
[52] U.S. Cl. ........................................ 141/348; 46/90; 137/231; 251/149.1
[58] Field of Search ................... 46/90; 137/223, 225, 137/852, 859, 224, 231, 234.5; 141/4, 10, 99, 114, 197, 293, 225, 313, 317, 346–350, 383; 222/3, 70; 251/20, 22, 149.6, 149.1, 149.7

[56] References Cited

U.S. PATENT DOCUMENTS 2,585,863  2/1952  Smith ................................. 137/859

FOREIGN PATENT DOCUMENTS 655197  1/1963  Canada ..................................... 141/293

Primary Examiner—Richard E. Aegerter
Assistant Examiner—Frederick R. Schmidt
Attorney, Agent, or Firm—Lyon & Lyon

[57] ABSTRACT

A toy balloon is automatically filled with helium gas using a system responsive to gas pressure. A novel check valve in the neck of the balloon is automatically opened upon insertion of a filler element. The flow of gas to the filler element from a constant pressure source is initiated by operation of a pushbutton which opens a valve which is resettable as a result of subsequent pressure build-up in the system. Opening of this valve results in opening a pilot valve through which gas flows to the balloon. Opening of the pushbutton operated valve also applies pressure to an expansible chamber of a timer valve through conduit means and when the pressure in such conduit means and in said expansible chamber become sufficiently high after a predetermined time (established to some degree by conditions in the nozzle and check valve) the timer valve is operated to apply gas pressure to an expansible chamber of the pushbutton valve to return it to its closed position thereby interrupting all flow to the balloon. An auxiliary manually operated valve is incorporated in the system to control the flow of gas to a balloon without the necessity of initiating the automatic cycle described above.

2 Claims, 5 Drawing Figures

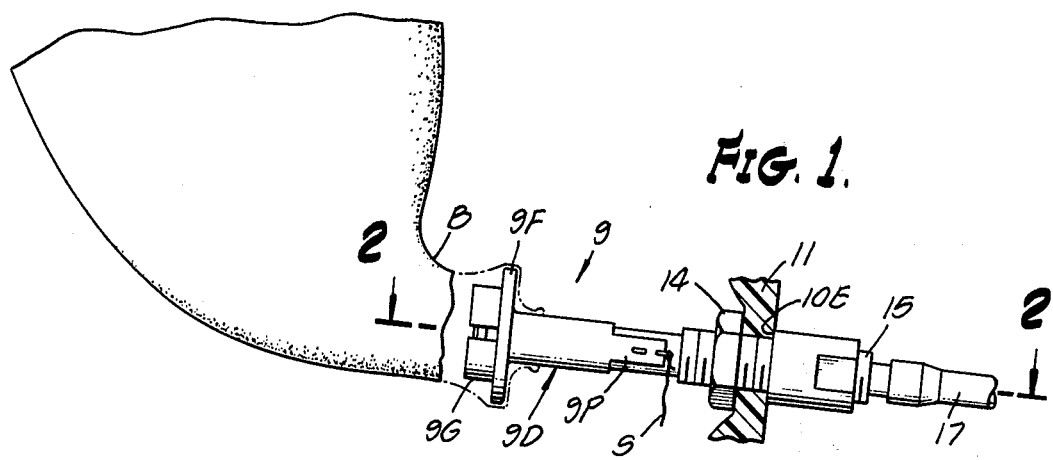
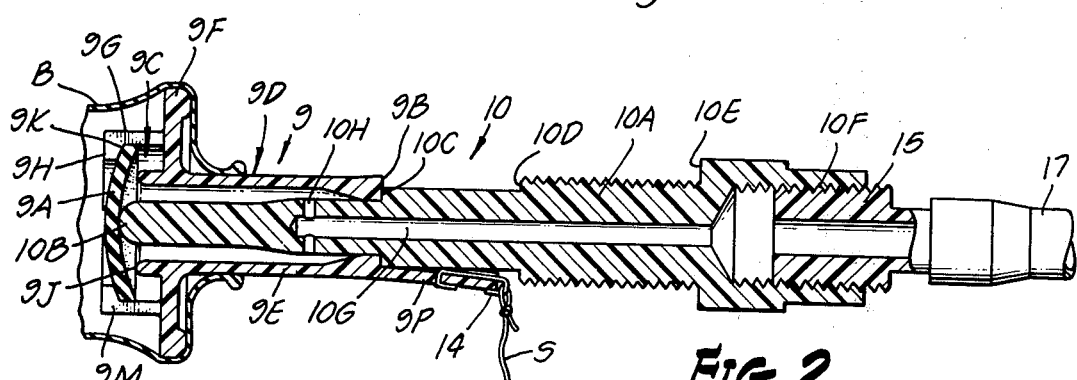
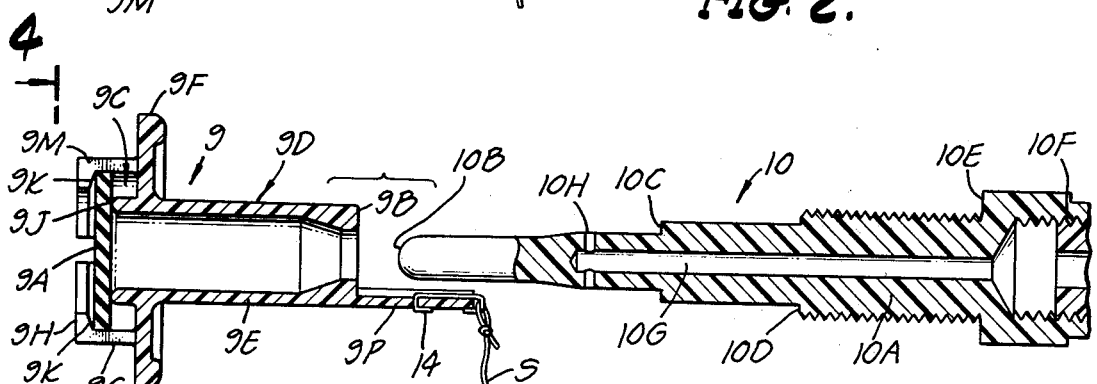
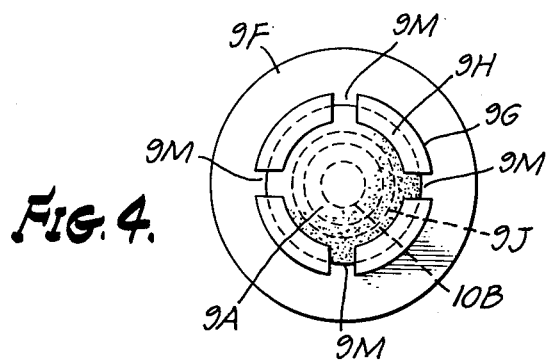

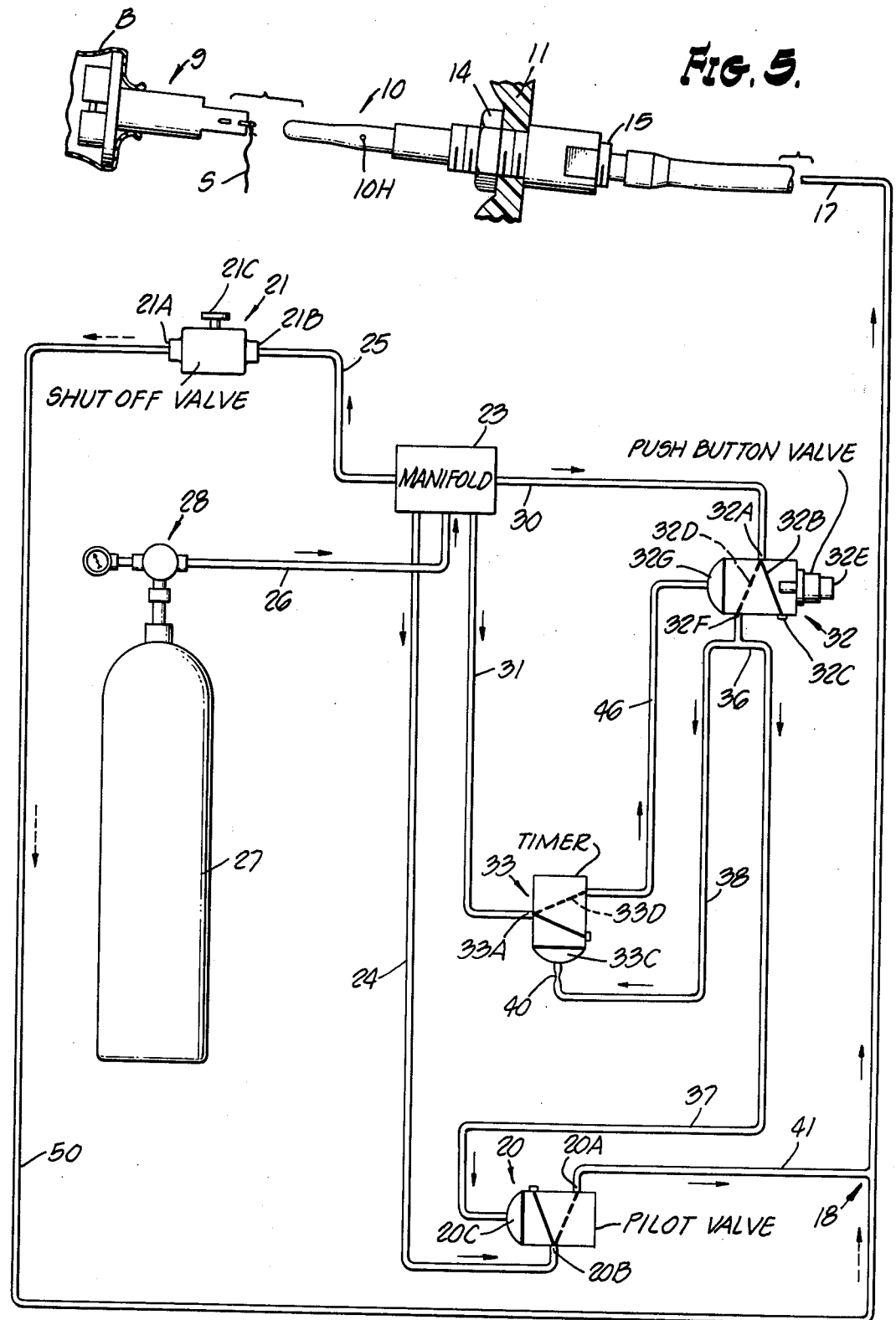

APPARATUS FOR INFLATING TOY BALLOONS

This is a continuation of Ser. No. 679,475 filed Apr. 22, 1976, now abandoned, which was a division of Ser. No. 563,500 filed Mar. 31, 1975, now U.S. Pat. No. 3,994,324 granted Nov. 30, 1976.

The present invention relates to improved means for techniques useful in inflating toy balloons.

An object of the present invention is to provide an improved toy balloon inflating system.

Another object of the present invention is to provide an improved filling valve for a toy balloon, such valve being particularly useful in the improved inflating system mentioned above.

While mention is made herein of toy balloons, it will be appreciated that the invention in its broader aspects is applicable also to other inflatable articles.

A specific object of the present invention is to provide an improved balloon inflating system which is responsive in its operation to pressure derived from the gas filling source and functions such that the necessity of auxiliary equipment, e.g. batteries is obviated.

Another specific object of the present invention is to provide an improved check valve insertable in the neck of the balloon and functioning to permit the flow of pressurized gas only into the balloon and requiring a manipulation to permit the exhaustion of the pressurized gas from the balloon.

Another specific object of the present invention is to provide an improved check valve insertable in the neck of the balloon with such valve functioning in a novel manner with respect to an insertable element of the filling apparatus.

Another specific object of the present invention is to provide an improved check valve of this character which is relatively simple, inexpensive to manufacture, and yet is capable of providing good sealing at those low pressure differentials which prevail between the inside and outside of the toy balloon.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 illustrates a toy balloon in the process of being inflated by apparatus constituting a preferred embodiment of this invention.

FIG. 2 is a sectional view taken substantially on the lines 2—2 in FIG. 1.

FIG. 3 is a view similar to FIG. 2 but with the valve actuating and filler element in its retracted position.

FIG. 4 is an end view taken substantially as indicated by the lines 4—4 in FIG. 3.

FIG. 5 is a toy balloon inflating system embodying features of the present invention which incorporate the check valve and its filler actuating element which are illustrated in the previous FIGS. 1-4.

Referring to the inflating system shown in FIG. 5, it includes the check valve 9 which is normally self retained in the neck portion of a toy balloon B inflated by the apparatus shown in FIG. 5. The filler element 10 stationarily mounted on support member 11 cooperates with the check valve 9 to actuate it to its valve open condition illustrated in FIG. 2. The filler element 10 comprises a circular tubular metal element 10A which has a rounded imperforate nose portion 10B, three shouldered portions 10C, 10D, and 10E and a hollow internally threaded portion 10F which is in communication with the blind bore 10G, such bore 10G being in communication with a plurality of radial ports 10H. The external stop shoulder 10C is engaged by the end shoulder 9B of the tubular member 9D.

Once positioned as shown in FIG. 2, the nose portion 10B engages and deflects the circular resilient disc 9A, which may be of rubber or like material, from its normally closed valve condition shown in FIG. 3 to its open filling position shown in FIG. 2. In such case, relative inward movement of the filler element 10 in the valve element 9 is limited by engagement of the shouldered portion 10C with an end portion 9B of the valve 9.

This resilient disc 9A is initially in the manufacturing process inserted into and self retained in a cage portion 9C defined by integral portions of a plastic housing member 9D.

It will be seen that the housing member 9D is formed with a relatively long tubular member 9E of relatively small diameter from which the radially extending flange 9F extends. The flange 9F as illustrated in FIG. 2 sealingly engages the inner surface of the neck portion of balloon B. Integrally formed with the flange 9F is a cage portion 9G of relatively large diameter, such cage portion 9G being formed at its end with an inwardly extending lip portion 9H. As illustrated, such flange portion cage 9H is spaced both axially and radially, from the inner end 9J of the tubular portion 9D and is formed with an inner annular tapered surface 9K to provide a retention means for the disc 9A and also to provide a conforming stop for such valve disc 9A in its deformed condition shown in FIG. 2. Also, as illustrated in FIG. 4, such cage 9H is apertured by four slit portions 9M that serve as openings through which the gas may flow when the disc 9A is deformed to its open condition shown in FIG. 2.

Normally, the valve disc 9A, in its condition shown in FIG. 3, has a portion thereof engaging the end 9J, such end 9J thus serving as a valve seat that sealingly engages the resilient disc 9A thereby normally preventing reverse flow of gas from a balloon B to the atmosphere, once the balloon is filled with helium or other gas. However, once filled, gas may be released from the balloon if desired, by inserting an element (not shown) into the valve 9 with sufficient force to produce a deflection of the rubber disc 9A valve in which case gas may then exit through the four slit portions 9M, past the valve seat 9J, and through the tubular portion 9D.

It is noted that the tubular portion 9D is provided with an extended portion 9P for securing one end ned of a flexible string S using for example, a metal staple 14 secured to such end portion 9P and providing an eyelet for one end of the string S. Such string of long length which may be stored by initially winding it around the extension 9P, is of course, useful to control the balloon when it is inflated with a gas lighter than air as for example, helium.

It will be appreciated from the foregoing description that when the housing 9D is moved telescopically into position over the filler element 10 nozzle 10 is inserted as shown in FIG. 2, and there is pressure in the bore 10G, a balloon B self secured on the flange 9F will be inflated.

The description which follows, describes apparatus capable of supplying such gas under pressure for a finite controlled time such that balloons of different nominal sizes, may be properly inflated to achieve such nominal sizes. For these purposes, the filler element 10 secured by nut 14 to support 11, is threaded on the externally threaded portion of a hose fitting 15 on hose 17. Hose 17, as illustrated, is connected to a Tee fitting 18, so as to receive gas under pressure from either the outlet port 20A of a pilot valve 20 or the outlet port 21A of a manual shut off valve 21. The inlet port 20B of pilot valve 20 is, as well as the inlet port 21B of shut off valve 21, in communication with a manifold 23 via conduits 24 and 25 respectively. Such manifold 23 is supplied with gas, such as helium under pressure, from a conventional gas cylinder 27 through a conventional pressure regulator valve 28 which functions to maintain the gas flowing from valve 28 to the manifold 23 via conduit 26 under substantially constant pressure. The manifold 23 which may be thus referred to as a constant gas pressure source, has two other conduits 30 and 31 extending therefrom in communication respectively with the inlet ports 32A, 33A of a pushbutton valve 32 and a timer valve 33 respectively.

The pushbutton valve 32 is normally closed as indicated by the solid line 32B which extends from the inlet port 32A to a closed port 32C, but such valve 32 may be actuated to its open position illustrated by the dotted line 32D by manual actuation of the pushbutton 32E, in which case the inlet and outlet ports 32A, 32F of the valves 32 are in communication to thereby pressurize the expansible chambers 20C and 33C of the pilot valve 20 and timer valve 33 respectively. The outlet port 32F of valve 32 is in communication with the aforementioned chambers 20C and 33C through a Tee connection 36 and corresponding conduits 37, 38.

In operation of the system shown in FIG. 5, the valves 21 and 32 are normally closed in which case gas is prevented from escaping through the filler element 10. To institute a cycle of operations, the push-button 32E of valve 32 is depressed, in which case gas under pressure is supplied from gas cylinder 27 and conduit 26 and manifold 23 and conduit 30 and valve 32 and Tee connection 36 and through the conduits 37 and 38 to the corresponding chambers 20C, 33C of the pilot valve 20 and timer valve 33. It will be noted that the conduit 38 leading to the chamber 33C of the timer valve 33 is illustrated as having a restricted opening 40. Such restricted opening 40 is representative of the condition and functioning of timer valve 33 which operates and functions with a time delay required for the gas pressure in its chamber 33C to become sufficiently high to actuate the timer valve 33 from its normally closed condition shown in FIG. 5 to its open position illustrated by the dotted line 33D. It will thus be appreciated that the pilot valve 20 is operated before the timer valve 33 as a result of a relatively quick buildup in pressure in the expansible chamber 20C. Thus, in a relatively short time, the pilot valve 20 is opened in which case gas is free to flow from the manifold 30 and from the inlet port 20B to the outlet port 20A via connection 24 and to the outlet conduits 41 and 17 thereby causing a flow of gas through the longitudinal passage 10G (FIG. 2) and out through the apertured portions 9M (FIG. 4), and into a balloon. This gas flow into the balloon remains uninterrupted until a sufficient time has elapsed as required for operation of the timer valve 33 from its normally closed condition shown in FIG. 5 to its open position illustrated by the dotted line 33D. When the timer valve 33 is eventually open, gas under pressure is supplied from the manifold 23 via conduit 31 and valve 33 and conduit 46 to the expansible chamber 32G of the push-button valve 32 and when the pressure in such chamber 32G is sufficiently high, the push-button valve 32 is actuated back to its normal closed condition illustrated by the full line 32B.

It will be appreciated from the foregoing, that there is some interdependency between filling time and nominal size of the balloon, in that when a larger size balloon is being inflated, a larger time, depending upon the size of restricted orifice 40, is required. For that reason, the size of the opening in the restricted orifice 40 is adjustable so that such size is relatively small for inflating large balloons and relatively large for small balloons.

Instead of operating the push-button valve 32 a balloon may be filled by manual operation of the push-button 21C of the normally closed shut off valve 21 in which case there is a flow of gas under pressure from the manifold 23 through the valve 21 and conduits 50 and 17 to the filler element 10. The provision of this shut off valve 21 is particularly useful in adding gas to a partially filled balloon to replace an amount of gas with helium to supply amounts which may have leaked through the latex wall of the balloon during, for example, an overnight inflated condition.

While the particular embodiments of the present invention have been shown and described, it will be obvious to those skilled in the art that changes and modifications may be made without departing from the invention in its broader aspects and, therefore, the aim in the appended claims is to cover all changes and modifications as fall within the true spirit and scope of this invention.

I claim:

1. Apparatus for inflating balloons comprising, in combination: an inflatable balloon having a neck portion, a check valve assembly including a tubular member having an annular valve seat at one end, a radially extending integral flange on said tubular member adjacent said valve seat, a portion of the balloon neck encompassing said tubular member and said flange to prevent separation of said balloon neck and said tubular member, a circular imperforate resilient disk within the neck of the balloon engageable with said annular seat to prevent escape of gas from the interior of the balloon through the interior of said tubular member, apertured means carried on said flange for supporting said disk in position said opertured means having at least one operture therethrough through which gas may flow into said balloon when said disk is moved from its seat, a stationary filler element having a rounded imperforate nose portion, said nose portion being received within the interior of said tubular portion upon relative telescopic movement of said tubular member with respect to said filler element, said tubular member having an end shoulder remote from said annular seat engaging an external stop shoulder formed on said filter element, said filter element having a longitudinal passage therein extending beyond said stop shoulder but terminating short of said rounded nose portion, said filter element having a lateral port located between said rounded nose portion and said external stop shoulder, said rounded nose portion contacting said resilient disk to move it away from said annular seat when the end shoulder of said tubular member engages the external stop shoulder on said filler element, whereby gas supplied to said longitudinal passage may pass through the port and into an annular space between the tubular member and the filler element and then into the neck of the balloon through said apertured support means.

2. The combination set forth in claim 1 including timer controlled means for supplying gas under pressure to said longitudinal passageway.

* * * * *